United States Patent
Fukuyasu et al.

(10) Patent No.: US 10,596,742 B2
(45) Date of Patent: Mar. 24, 2020

(54) MANUFACTURING PROCESS FOR FILLER TUBE

(71) Applicant: SUMITOMO RIKO COMPANY LIMITED, Komaki-shi, Aichi (JP)

(72) Inventors: Tomoyuki Fukuyasu, Komaki (JP); Makoto Shimojo, Komaki (JP); Atsuo Miyajima, Komaki (JP); Kazuki Hatanaka, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 213 days.

(21) Appl. No.: 15/596,678

(22) Filed: May 16, 2017

(65) Prior Publication Data

US 2017/0246790 A1 Aug. 31, 2017

Related U.S. Application Data

(63) Continuation of application No. PCT/JP2016/069661, filed on Jul. 1, 2016.

(30) Foreign Application Priority Data

Jul. 7, 2015 (JP) .................................. 2015-135822

(51) Int. Cl.
*B29C 49/00* (2006.01)
*B29C 57/04* (2006.01)
(Continued)

(52) U.S. Cl.
CPC .......... *B29C 49/0015* (2013.01); *B29C 35/02* (2013.01); *B29C 57/04* (2013.01);
(Continued)

(58) Field of Classification Search
None
See application file for complete search history.

(56) References Cited

U.S. PATENT DOCUMENTS 3,998,578 A * 12/1976 Acda ...................... B29C 57/02
425/393
2007/0181582 A1 8/2007 Gerard et al.
2016/0109042 A1 4/2016 Hirohara et al.

FOREIGN PATENT DOCUMENTS

GB 2115340 A 9/1983
JP 2003-194280 A 7/2003
(Continued)

OTHER PUBLICATIONS

Aug. 2, 2016 Search Report issued in International Patent Application No. PCT/JP2016/069661.
(Continued)

*Primary Examiner* — Monica A Huson
(74) *Attorney, Agent, or Firm* — Oliff PLC (57) ABSTRACT

A manufacturing process for filler tube includes: a workpiece arrangement step of arranging a workpiece onto an outer peripheral mold not only to axially lock a to-be-locked portion with respect to a locking portion but also so as to make the outer peripheral mold, which is set at a predetermined temperature, support a cylinder-shaped body of the workpiece on the outer peripheral face; and a flare-molding step of flare molding a flange by inserting an inner peripheral mold, which is set at a higher temperature than the predetermined temperature of the outer peripheral mold, into a to-be-molded portion on the inner peripheral side, and by relatively moving the outer peripheral mold and the inner peripheral mold in the axial direction to make a counter-welding-face forming portion and a welding-face forming portion clamp the to-be-molded portion between them in the axial direction.

13 Claims, 7 Drawing Sheets

(51) Int. Cl.
*B60K 15/04* (2006.01)
*B60K 15/01* (2006.01)
*B29C 35/02* (2006.01)
B29L 31/00 (2006.01)
B29L 23/00 (2006.01)

(52) U.S. Cl.
CPC .............. *B60K 15/01* (2013.01); *B60K 15/04* (2013.01); *B29K 2023/06* (2013.01); *B29L 2023/22* (2013.01); *B29L 2031/7172* (2013.01)

(56) References Cited

FOREIGN PATENT DOCUMENTS

| | | |
|---|---|---|
| JP | 3775656 B2 | 5/2006 |
| JP | 2014-231286 A | 12/2014 |

OTHER PUBLICATIONS

Oct. 16, 2019 Office Action issued in German Patent Application No. 11 2016 001 335.3.

\* cited by examiner

MANUFACTURING PROCESS FOR FILLER TUBE

CROSS REFERENCE TO RELATED APPLICATIONS

The present application is a Continuation application of International Application No. PCT/JP2016/069661, filed on Jul. 1, 2016, which is incorporated herein by reference. The present invention is based on Japanese Patent Application No. 2015-135822, filed on Jul. 7, 2015, the entire contents of which are incorporated herein by reference.

BACKGROUND OF THE INVENTION

1. Field of the Invention

The present invention relates to a manufacturing process for filler tube.

2. Description of the Related Art

Japanese Unexamined Patent Publication (KOKAI) Gazette No. 2014-231286 sets forth to weld the end face of a thermoplastic-resin filler tube to the opening of a fuel tank. The filler tube comprises a flange at the end to be welded to the fuel tank. Moreover, Japanese Unexamined Patent Publication (KOKAI) Gazette No. 2003-194280 also sets forth to weld the end face of a filler tube to the opening of a fuel tank. A welding site in the filler tube is formed in a heavy thickness, compared with the other sites. In addition, it is deemed possible to make the filler tube have a heavy thickness by corrugation molding.

SUMMARY OF THE INVENTION

Note herein that Japanese Unexamined Patent Publication (KOKAI) Gazette No. 2014-231286 does not set forth on a method how to mold a flange in a filler tube having the flange. In general, it is believed that, in molding the flange, a cylindrical workpiece for filler tube is flare molded at one of the ends. In order to carry out flare molding the flange, the filler-tube workpiece is positioned in the vicinity of one of the opposite ends onto one of molds, and then another one of the molds is moved relatively to clamp the one of the ends between the two molds. Moreover, upon carrying out flare molding the flange, it is necessary to heat a thermoplastic-resin filler tube.

However, in order to flare deform the filler-tube workpiece at the one of the ends, the workpiece turns into a state of being likely to deform, because the molds warm the workpiece when the molds give an axial force to the filler tube. As a result, a force, which is exerted by the one of the molds to retain the filler tube at the location, declines. If so, such a case arises as the flange cannot be molded at a desired position, because axial relative positions between the one of the molds and the filler have been displaced or misaligned.

Note that, in the filler tube set forth in Japanese Unexamined Patent Publication (KOKAI) Gazette No. 2003-194280, the aforementioned problem does not occur, because the filler tube does not have any flange so that it is not necessary to carry out flare molding.

The present invention is aimed at providing a manufacturing process for filler tube, manufacturing process which enables a mold to retain a filler tube at a predetermined location when molding a flange by flare molding, and which makes it possible to mold the flange securely.

The present invention is a manufacturing process for filler tube to be weld to a fuel tank at an opening thereof, and made of thermoplastic resin. The filler tube comprises: a cylinder-shaped body; a flange elongating outward radially from the cylinder-shaped body at an end thereof, and having an end face to be welded to the fuel tank; and a locking portion disposed in the cylinder-shaped body on an outer peripheral side thereof. A workpiece for the filler tube comprises: the cylinder-shaped body; a cylindrical to-be-molded portion serving as a site before flare molding the flange; and the locking portion.

The manufacturing process uses an outer peripheral mold, and an inner peripheral mold. The outer peripheral mold comprises: a counter-welding-face forming portion capable of supporting the cylinder-shaped body of the workpiece on an outer peripheral face thereof, and capable of forming a counter-welding face in the flange; and a to-be-locked portion locking with respect to the locking portion in an axial direction thereof. The inner peripheral mold comprises: a welding-face forming portion insertable into the to-be-locked portion of the workpiece at least, and capable of forming a welding face in the flange.

The manufacturing process comprises: a workpiece arrangement step of arranging the workpiece onto the outer peripheral mold not only to axially lock the to-be-locked portion with respect to the locking portion but also so as to make the outer peripheral mold, which is set at a predetermined temperature, support the cylinder-shaped body of the workpiece on an outer peripheral face thereof; and a flare-molding step of following the workpiece arrangement step to flare mold the flange by inserting the inner peripheral mold, which is set at a higher temperature than the predetermined temperature of the outer peripheral mold, into the to-be-molded portion on an inner peripheral side thereof, and by relatively moving the outer peripheral mold and the inner peripheral mold in an axial direction thereof to make the counter-welding-face forming portion and the welding-face forming portion clamp the to-be-molded portion therebetween in the axial direction.

In accordance with the aforementioned manufacturing process, the flange is molded by flare molding the cylindrical to-be-molded portion in the workpiece. On this occasion, the outer peripheral mold, which supports the filler tube on the outer peripheral side, and the inner peripheral mold, which supports it on the inner peripheral side, are used. Note herein that, at the flare-molding step, the inner peripheral mold is set at a higher temperature than that of the outer peripheral mold. That is, the inner peripheral mold warms the to-be-molded portion of the workpiece to turn it into a state of being likely to be flare molded.

Meanwhile, at the flare-molding step, the outer peripheral mold has a low temperature, compared with that of the inner peripheral mold. The outer peripheral mold is a mold onto which the workpiece is arranged prior to the flare-molding step. On this occasion, the locking portion of the workpiece is turned into a state of locking to the to-be-locked portion of the outer peripheral mold. That is, since the outer peripheral mold has a lower temperature even when the inner peripheral mold is set to have a higher temperature at the flare-molding step, the workpiece does not turn into a state of being likely to deform at the site contacting with the outer peripheral mold, so that displacements or misalignments are less likely to occur in relative positions between the outer peripheral mold and the workpiece. Therefore, the flange is flare molded at a desired position.

DESCRIPTION OF THE EMBODIMENTS

(1) Construction of Fuel Line 1

Figure 1:
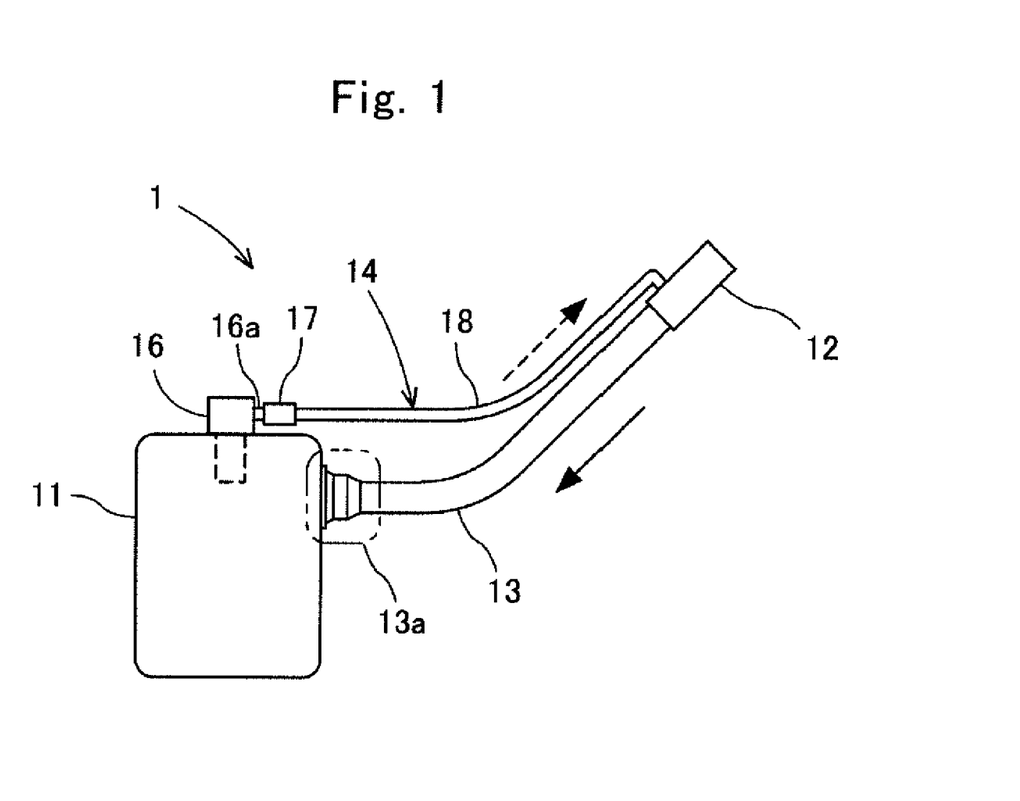
FIG. 1 is a diagram of a fuel line.

Explanations will be hereinafter made on the construction of a fuel line 1 with reference to FIG. 1. A term, the "fuel line 1," is referred to a line from a filler neck up to an internal combustion engine (not shown) in an automobile. However, explanations will be made on from a filler neck 12 up to a fuel tank 11 alone in the present embodiment.

The fuel line 1 comprises the fuel tank 11, the filler neck 12, a filler tube 13, and a breather line 14. The fuel tank 11 reserves a liquid fuel, such as gasoline, therein. The liquid fuel reserved in the fuel tank 11 is supplied to the not-shown internal combustion engine, and is then used to drive the internal combustion engine. The filler neck 12 is disposed in the vicinity of an automotive outer surface into which a filler nozzle (not shown) is insertable. Onto the filler neck 12, a not-shown filler cap is mounted.

The filler tube 13 is molded by thermoplastic resin, and connects from the filler neck 12 up to the fuel tank 11. The filler nozzle is inserted into the filler neck 12, and then the liquid fuel is supplied from the filler nozzle. Accordingly, the liquid fuel passes through the filler tube 13, and is then reserved in the fuel tank 11. Note herein that, when the liquid fuel fills up the fuel tank 11, the liquid fuel comes to be reserved in the filler tube 13, and then the liquid fuel touches the filler nozzle at the leading end. Consequently, the supply of the liquid fuel by the filler nozzle is stopped automatically. Note that the filler tube 13 is molded integrally over the entire length, but its midway bent portion is also allowed so as to have a bellows section; or the midway bent portion is even permitted to be molded into a non-bellows section by a bent-tube molding method.

The breather line 14 connects the fuel tank 11 with the filler neck 12. The breather line 14 is a line for exhausting fuel vapors within the fuel tank 11 to the outside of the fuel tank 11 upon supplying the liquid fuel to the fuel tank 11 by way of the filler tube 13.

The breather line 14 comprises a cut-off valve apparatus 16, a connector 17, and a breather tube 18. The cut-off valve apparatus 16 is arranged on the upside of the fuel tank 11; when it is put in an opened state, the fuel vapors within the fuel tank 11 are exhausted toward a side of the filler neck 12. The cut-off valve apparatus 16 includes a connection pipe 16a made of metal. The connector 17 is coupled to the connection pipe 16a. The connector 17 is made up of such constituent elements as those of a connector (set forth in Japanese Patent Gazette No. 3775656, and so forth, for instance) from which the flow control valve is removed. That is, the connector 17 is disposed detachably to and from the connection pipe 16a. The breather tube 18 connects the connector 17 with the filler neck 12.

(2) Construction of Filler Tube 13

Explanations will be hereinafter made on the construction of an end 13a of the filler tube 13 shown in FIG. 1, the end 13a facing a side of the fuel tank 11, with reference to FIG. 2A and FIG. 2B. The end 13a of the filler tube 13 includes a cylinder-shaped body 20, and a flange 30.

The cylinder-shaped body 20 is provided with a circularly cylindrical thin-thickness portion 21, a tapered cylinder portion 22, and a circularly cylindrical heavy-thickness portion 23. Note that, although the following are not illustrated, it is also allowable to provide the cylinder-shaped body 20 with a bellows section in some of the thin-thickness portion 21 consecutively on one of the sides opposite to or across from the tapered cylinder portion 22.

The heavy-thickness portion 23 is formed to have a thickness that is thicker than that of the thin-thickness portion 21. Moreover, an outside diameter of the heavy-thickness portion 23 is larger than an outside diameter of the thin-thickness portion 21, and an inside diameter of the heavy-thickness portion 23 is larger than an inside diameter of the thin-thickness portion 21. The tapered cylinder portion 22 connects an end of the thin-thickness portion 21 continuously with an end of the heavy-thickness portion 23. Specifically, an inner peripheral face of the tapered cylinder portion 22 connects an inner peripheral end of the thin-thickness portion 21 with an inner peripheral end of the heavy-thickness portion 23 in a tapered shape, and an outer peripheral face of the tapered cylinder portion 22 connects an outer peripheral end of the thin-thickness portion 21 with an outer peripheral end of the heavy-thickness portion 23 in a tapered shape. The cylinder-shaped body 20 whose thickness thus varies is molded by corrugation molding, namely, extrusion blow molding using a corrugated mold.

Note herein that, although it is needed that a workpiece 50 for the filler tube 13 be axially positioned with respect to an outer peripheral mold 70 in a later-described manufacturing process for the filler tube 13, the tapered cylinder portion 22 of the cylinder-shaped body 20 functions as a locking portion locking to the outer peripheral mold 70. That is, the tapered cylinder portion 22 serving as the locking portion comes to be disposed in the cylinder-shaped body 20 on the outer peripheral side.

The flange 30 is formed integrally with the cylinder-shaped body 20, and has an end face elongating outward radially from an end of the cylinder-shaped body 20, and to be welded to the fuel tank 11. Although the following will be described later, the flange 30 is molded, not by corrugation molding, but by flare molding (or expansion opening molding) with molds. The flange 30 includes a tapered cylinder portion 31, and a disk portion 32. The tapered cylinder portion 31 is formed in a thickness that is virtually comparable with that of the heavy-thickness portion 23 of the cylinder-shaped body 20, and is further expanded radially toward one of the ends more than the heavy-thickness portion 23 is. The disk portion 32 elongates from a major diameter end of the tapered cylinder portion 31 outward radially in a planar shape. One of the opposite faces of the disk portion 32 makes a welding face to the fuel tank 11. The disk portion 32 is formed in a thickness that is virtually comparable with that of the tapered cylinder portion 31.

The above-described filler tube 13 has a multi-layered structure by different species of thermoplastic resins. To put it in detail, the filler tube 13 comprises an inner layer 41, a fuel barrier layer 42 preventing the fuel from permeating, an outer layer 43, an inner adhesive layer 44 adhering the inner layer 41 with the fuel barrier layer 42, and an outer adhesive layer 45 adhering the fuel barrier layer 42 with the outer layer 43, as shown in FIG. 2B.

The inner layer 41 in the disk portion 32 of the flange 30 makes the welding face to the fuel tank 11. Consequently, the inner layer 41 in the disk portion 32 of the flange 30 is molded with the same species of a quality of material as a quality of material for a site of the fuel tank 11 to which it is welded. Moreover, the inner layer 41 at another site other than the disk portion 32 makes a face with which the distributing fuel contacts directly.

The respective layers are formed by the following qualities of materials. The inner layer 41 is high-density polyethylene (or HDPE); the fuel barrier layer 42 is ethylene-vinyl alcohol copolymerized resin (or EVOH); the outer layer 43 is polyethylene (or PE); and the inner adhesive layer 44 and outer adhesive layer 45 are modified polyethylene (or modified PE).

The inner layer 41 and outer layer 43 are formed thickly, compared with the other layers (42, 44, 45). In particular, the inner layer 41 is formed thicker than the outer layer 43 in order to secure a retention force resulting from welding. Moreover, the inner layer 41 exhibits an elastic coefficient that is higher than that of the outer layer 43. That is, the inner layer 41 is relatively less likely to deform than the outer layer 43 is.

Although the following are not illustrated herein in detail, the cylinder-shaped body 20 is also made to have a multi-layered structure in the same manner as the flange 30. However, the flange 30 includes the respective layers whose thickness slightly differs from the thickness of those in the cylinder-shaped body 20, because it is flare molded.

(3) Construction of Workpiece 50 for Filler Tube 13

Explanations will be hereinafter made on the construction of a workpiece 50 for the filler tube 13 with reference to FIG. 3A and FIG. 3B. As illustrated in FIG. 3A, the workpiece 50 comprises the cylinder-shaped body 20, and a cylindrical to-be-welded portion 51 serving as a site before the flange 30 is flare molded. Note herein that the cylinder-shaped body 20 of the workpiece 50 is identical with the cylinder-shaped body 20 of the filler tube 13 shown in FIG. 2A. That is, the cylinder-shaped body 20 of the workpiece 50 includes the thin-thickness portion 21, the tapered cylinder portion 22, and the heavy-thickness portion 23. Therefore, the workpiece 50 comprises the tapered cylinder portion 22 serving as a locking portion.

The to-be-molded portion 51 is formed as a cylindrical shape whose thickness is the same as that of the heavy-thickness portion 23 of the cylinder-shaped body 20, and whose configuration is identical with that of the heavy-thickness portion 23. As illustrated in FIG. 3B, the to-be-molded portion 51 includes an inner layer 61, a fuel barrier layer 62, an outer layer 63, an inner adhesive layer 64, and an outer adhesive layer 65. The respective layers 61 through 65 are equivalent to the respective layers 41 through 45 in the filler tube 13. However, the two have thicknesses differing from one another, because the to-be-molded portion 51 of the workpiece 50 is flare molded to make the flange 30. In particular, the inner layer 41 in the flange 30 becomes slightly thinner than the inner layer 61 in the to-be-molded portion 51 of the workpiece 50.

(4) Manufacturing Process for Filler Tube 13

Next, explanations will be hereinafter made on a manufacturing process for the filler tube 13 with reference to the flowchart shown in FIG. 4, and to FIG. 5 through FIG. 7 that illustrate each of states in the manufacturing processes. First of all, extrusion blow molding using a corrugated mold is carried out to mold the workpiece 50, which is illustrated in FIG. 3A, (i.e., the workpiece molding step "S1" shown in FIG. 4). As described above, the workpiece 50 has a configuration in which the flange 30 has not been formed, in contrast to the filler tube 13 forming the final configuration.

Figure 4:
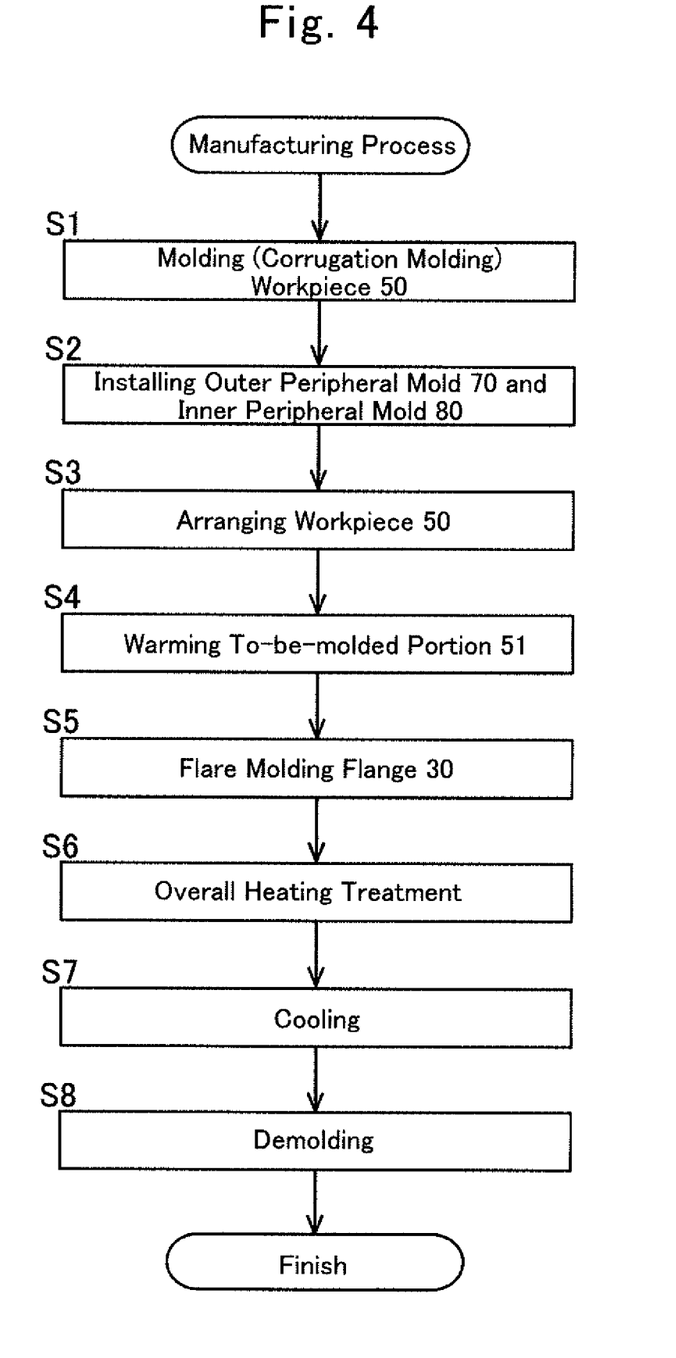
FIG. 4 is a flowchart illustrating a manufacturing process for the filler tube.
Figure 5:
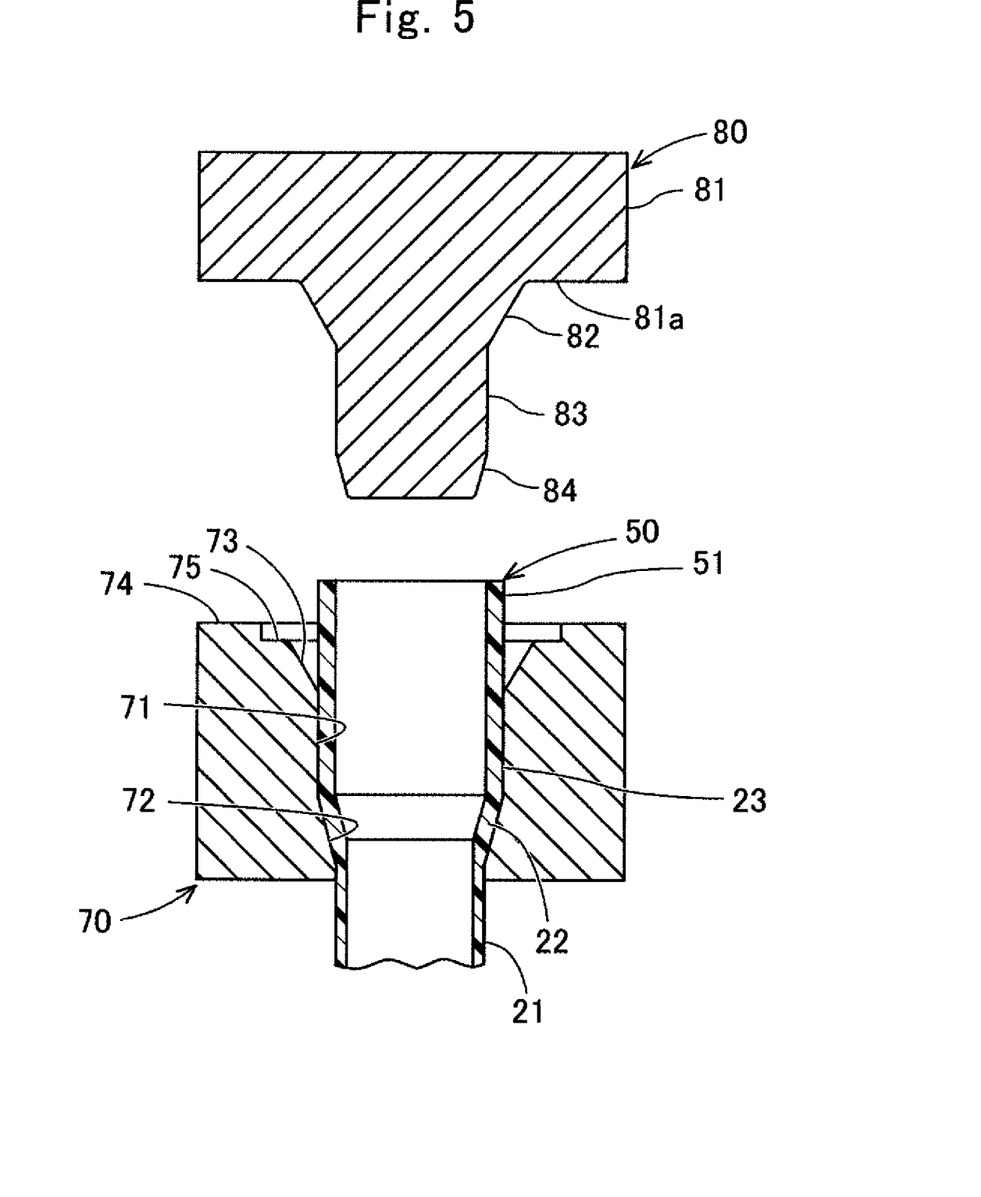
FIG. 5 is a diagram illustrating a workpiece arrangement step at "S3" shown in FIG. 4.

An outer peripheral mold 70 for flare molding the flange 30, and an inner peripheral mold 80 are subsequently mounted onto a pressing-apparatus main body (not shown), as shown in FIG. 5, (i.e., the molds installation step "S2" shown in FIG. 4). Note herein that the outer peripheral mold 70 is used as a lower mold, and the inner peripheral mold 80 is used as an upper mold. Moreover, the outer peripheral mold 70, and the inner peripheral mold 80 are separated off one another in the up/down direction.

The outer peripheral mold 70 is formed as a cylindrical shape into which the workpiece 50 is insertable at one of the ends. An inner peripheral face of the outer peripheral mold 70 includes: a circularly-cylindrical inner-peripheral face 71; a first tapered face 72 formed continuously below the circularly-cylindrical inner-peripheral face 71 (on one of the sides getting away from the inner peripheral mold 80), and reduced more radially as it goes more downward; and a second tapered face 73 formed continuously above the circularly-cylindrical inner-peripheral face 71 (on another one of the sides approaching the inner peripheral mold 80), and enlarged more radially as it goes more upward.

Note herein that the circularly-cylindrical inner-peripheral face 71 corresponds to the heavy-thickness portion 23 in the cylinder-shaped body 20 of the workpiece 50, and contacts with the outer peripheral face of the heavy-thickness portion 23. The first tapered face 72 corresponds to the tapered cylinder portion 22 in the cylinder-shaped body 20 of the workpiece 50, and contacts with the outer peripheral face of the tapered cylinder portion 22. That is, the first tapered face 72 functions as a to-be-locked portion for inhibiting the workpiece 50 from moving downward in FIG. 5, in such a state as it contacts with the tapered cylinder portion 22 of the workpiece 50. Therefore, the first tapered face 72 serving as a to-be-locked portion is locked in the axial direction with respect to the tapered cylinder portion 22 serving as a locking portion.

The second tapered face 73 is located at an axial position corresponding to the to-be-molded portion 51 of the workpiece 50, and is kept away from the outer peripheral face of the to-be-molded portion 51. The second tapered face 73 makes a site for molding the tapered cylinder portion 31 of the post-flare-molding flange 30.

An upper end face of the outer peripheral mold 70 (i.e., one of the faces opposing the inner peripheral mold 80) is provided with: a stopper plane face 74 located on an outer peripheral side in an entirely circumferential shape; and a counter-welding-face forming portion 75 formed as a circularly dented shape on an inner peripheral side of the stopper plane face 74 over the entire circumference. The counter-welding-face forming portion 75 is formed consecutively to the second tapered face 73. Moreover, a bottom face of the counter-welding-face forming portion 75 is formed as a plane-face shape parallel to the stopper plane face 74. The counter-welding-face forming portion 75 makes a site for molding a counter-welding face in the disk portion 32 of the post-flare-molding flange 30.

The inner peripheral mold 80 comprises: a body portion 81 corresponding to an external form of the outer peripheral mold 70; a first tapered face 82 protruding downward (i.e., toward a side of the outer peripheral mold 70) from the center of the body portion 81 while reducing radially; a circularly cylindrical face 83 extending from the leading end of the first tapered face 82 coaxially to be formed as a circularly cylindrical shape; and a second tapered face 84 extending coaxially from the leading end of the circularly cylindrical face 83 to be reduced radially.

Figure 2A:
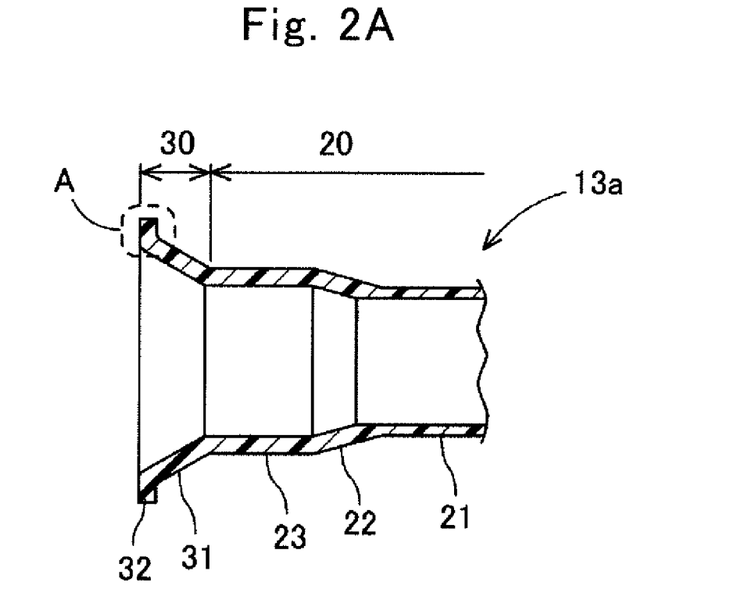
FIG. 2A is an enlarged cross-sectional diagram of the filler tube shown in FIG. 1 on the fuel-tank side.
Figure 2B:
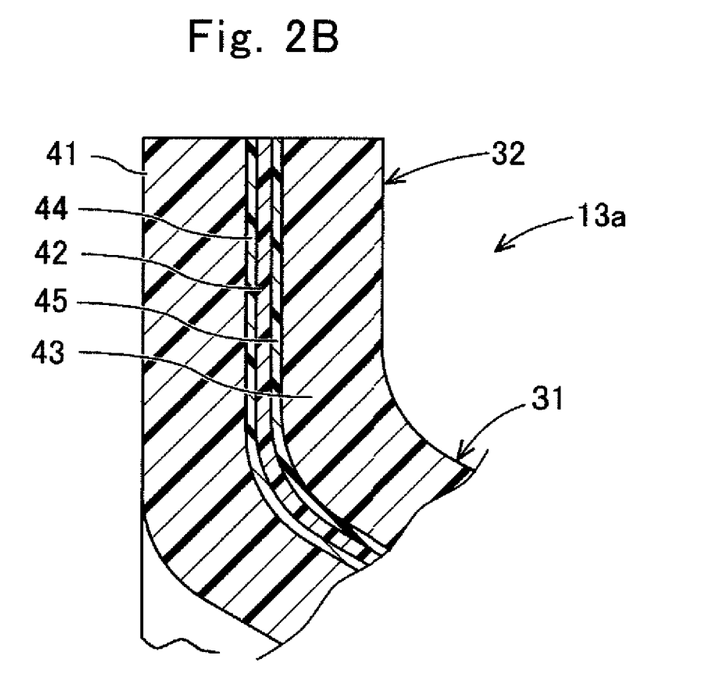
FIG. 2B is an enlarged diagram at the section "A" shown in FIG. 1.
Figure 3A:
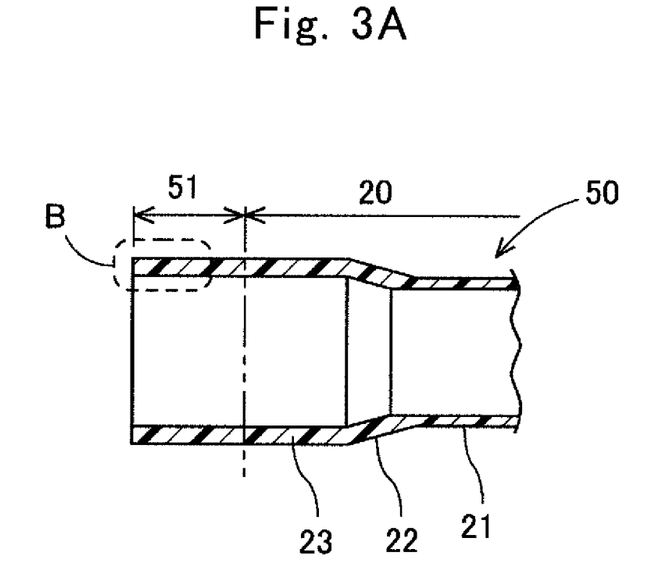
FIG. 3A is an enlarged cross-sectional diagram of a workpiece before flare molding the filler tube shown in FIG. 2A.
Figure 3B:
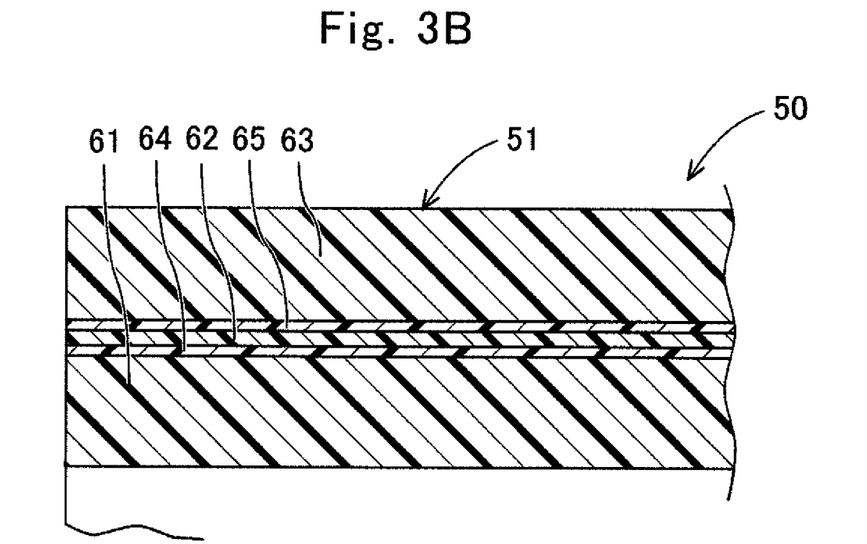
FIG. 3B is an enlarged diagram at the section "B" shown in FIG. 3A.

Note herein that the body portion 81 is provided with a welding-face forming portion 81a for making a face that opposes the stopper plane face 74 and counter-welding-face forming portion 75 in the outer peripheral mold 70, and which forms a welding face in the flange 30 (on the left side in FIG. 2A). The welding-face forming portion 81a contacts with the stopper plane face 74 to exhibit a function of inhibiting relative movements between the outer peripheral mold 70 and the inner peripheral mold 80. Moreover, the welding-face forming portion 81a is formed so as to separate off in the up/down direction with respect to the counter-welding-face forming portion 75, in such a state as it contacts with the stopper plane face 74.

The first tapered face 82 makes a site for forming the tapered cylinder portion 31 of the post-flare-molding flange 30. The circularly cylindrical face 83 corresponds to the heavy-thickness portion 23 of the workpiece 50, and is capable of contacting with the heavy-thickness portion 23 on the inner peripheral face. The second tapered face 84 corresponds to the tapered cylinder portion 22 of the workpiece 50, and is capable of contacting with the tapered cylinder portion 22 on the inner peripheral face.

After the molds installation step, the workpiece 50 is subsequently arranged onto the outer peripheral mold 70, as shown in FIG. 5, (i.e., the workpiece arrangement step "S3" shown in FIG. 4). The tapered cylinder portion 22 (i.e., a locking portion) in the cylinder-shaped body 20 of the workpiece 50 contacts with the first tapered face 72 (i.e., a to-be-locked portion) of the outer peripheral mold 70, and then the workpiece 50 is inhibited from moving downward in the axial direction with respect to the outer peripheral mold 70. On this occasion, the heavy-thickness portion 23 in the cylinder-shaped body 20 of the workpiece 50 contacts with the circularly-cylindrical inner-peripheral face 71 of the outer peripheral mold 70. That is, the outer peripheral mold 70 not only causes the first tapered face 72 (serving as a to-be-locked portion) of the outer peripheral mold 70 to axially lock to the tapered cylinder portion 22 (serving as a locking portion) of the workpiece 50, but also supports the cylinder-shaped body 20 of the workpiece 50 on the outer peripheral face.

On this occasion, the second tapered face 73 and counter-welding-face forming portion 75 of the outer peripheral mold 70 come not to contact with the to-be-molded portion 51 of the workpiece 50. Moreover, the outer peripheral mold 70 is set at a predetermined temperature when the workpiece 50 is arranged. In the present embodiment, the term, a "predetermined temperature," refers to an ordinary temperature (or room temperature), and is 25° C. approximately, for instance. That is, the outer peripheral mold 70 has not been warmed at this moment.

Figure 6:
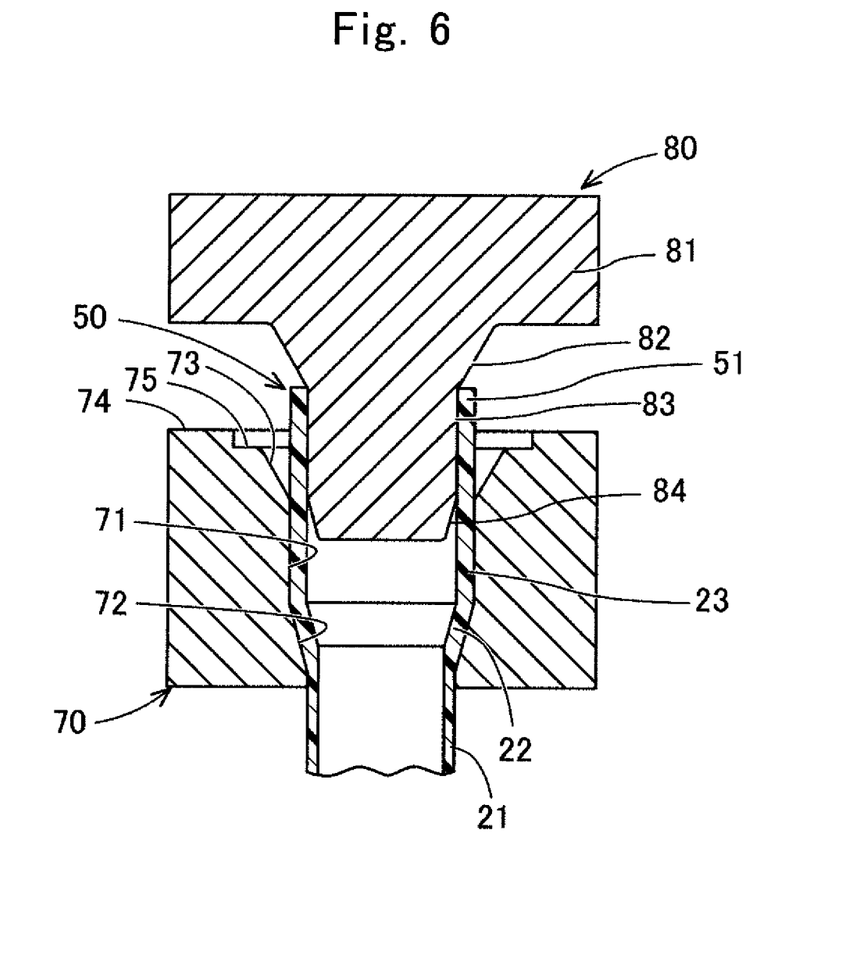
FIG. 6 is a diagram illustrating a warming step at "S4" shown in FIG. 4.

After completing the workpiece arrangement step as shown in FIG. 6, the inner peripheral mold 80 is subsequently set at a higher temperature than the temperature of the outer peripheral mold 70. The temperature of the inner peripheral mold 80 is not only a temperature that enables at least the inner layer 61 of the workpiece 50 to soften to such an extent as it can be flare molded, in such a state as the inner peripheral mold 80 is made to contact with the workpiece 50; but also a temperature at which the respective layers 61 through 65 constructing the workpiece 50 maintain the multi-layered structure. In the present embodiment, the inner peripheral mold 80 has a temperature that is sufficiently lower than the softening point of the fuel barrier layer 62.

Moreover, the higher-temperature inner peripheral mold 80 is made to approach to insert the second tapered face 84 of the inner peripheral mold 80 through the opening in the to-be-molded portion 51 of the workpiece 50. In addition, the inner peripheral mold 80 is made to further approach the outer peripheral mold 70 in order to cause the circularly cylindrical face 83 of the inner peripheral mold 80 to contact with the to-be-molded portion 51 of the workpiece 50 over the entire length, as shown in FIG. 6. Maintaining the state for a predetermined period of time leads to warming the to-be-molded portion 51 of the workpiece 50 (i.e., the warming step "S4" shown in FIG. 4). On this occasion, all of the layers 61 through 65 constructing the to-be-molded portion 51 are not at all softened to mix with each other. However, the inner layer 61 especially becomes softer, though, while maintaining the multi-layered structure.

On this occasion, the outer peripheral mold 70 is located at a position at which it does not contact with the to-be-molded portion 51. Moreover, the outer peripheral mold 70 is being kept at an ordinary temperature even at this moment. Consequently, although the workpiece 50 is warmed by the inner peripheral mold 80, it is not warmed at all by the outer peripheral mold 70.

Figure 7:
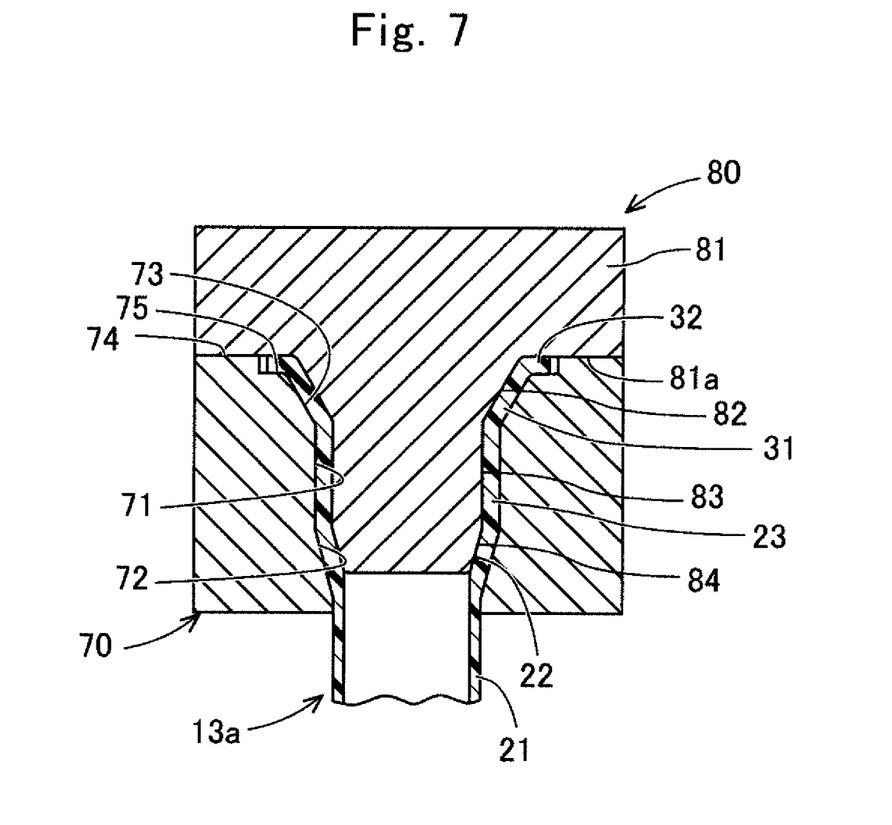
FIG. 7 is a diagram illustrating a flare-molding step at "S5" shown in FIG. 4.

After the warming step, the inner peripheral mold 80 is subsequently made to further approach the outer peripheral mold 70 so that the inner peripheral mold 80 is moved downward until it makes such a state as the welding-face forming portion 81a in the body portion 81 of the inner peripheral mold 80 contacts with the stopper plane face 74 of the outer peripheral mold 70, as shown in FIG. 7. The inner peripheral mold 80 is thus moved from the position during the warming step to another position at which it contacts with the outer peripheral mold 70. Moreover, the inner peripheral mold 80 is holdup for a predetermined period of time at the position at which it has contacted with the outer peripheral mold 70.

That is, the to-be-molded portion 51 of the workpiece 50 is deformed along the first tapered face 82 and welding-face forming portion 81a of the inner peripheral mold 80 so that the flange 30 is flare molded by the first tapered face 82 and welding-face forming portion 81a of the inner peripheral mold 80, and by the second tapered face 73 and counter-welding-face forming portion 75 of the outer peripheral mold 70 (i.e., the flare-molding step "S5" shown in FIG. 4).

To put the above in detail, the first tapered face 82 of the inner peripheral mold 80, first of all, deforms the to-be-molded portion 51 of the workpiece 50 to enlarge radially along the second tapered face 73, while contacting with the inner peripheral face in the to-be-molded portion 51 of the workpiece 50. Moreover, when the welding-face forming portion 81a of the inner peripheral mold 80 contacts with one of the ends in the to-be-molded portion 51 of the workpiece 50, the welding-face forming portion 81a of the inner peripheral mold 80 deforms the to-be-molded portion 51 of the workpiece 50 to further enlarge radially along the welding-face forming portion 81a.

If so, a part of the to-be-molded portion 51 of the workpiece 50 forms the tapered cylinder portion 31 of the flange 30 because of being clamped between the second tapered face 73 of the outer peripheral mold 70 and the first tapered face 82 of the inner peripheral mold 80 in the radial direction. Moreover, another part of the to-be-molded portion 51 of the workpiece 50 forms the disk portion 32 of the flange 30 because of being clamped between the counter-welding-face forming portion 75 of the outer peripheral mold 70 and the welding-face forming portion 81a of the inner peripheral mold 80 in the axial direction.

Moreover, the workpiece 50 becomes softer on a side of the inner layer 61, but is less likely to become softer on a side of the outer layer 63, compared with the side of the inner layer 61, because the inner peripheral mold 80 warms the workpiece 50 on the side of the inner layer 61 at the warming step. Consequently, although the inner layer 61 is in a state of being likely to flow, the outer layer 63 turns into a state of being comparatively less likely to flow.

Therefore, upon subjecting the to-be-molded portion 51 of the workpiece 50 to flare molding, the inner layer 61, which is likely to flow, tries to flow downward in the weight direction. However, when the other site equivalent to the disk portion 32 of the flange 30 is flare molded, the site does not fluidize, for example, to such an extent as it flows toward the bottom face in the counter-welding-face forming portion 75 of the outer peripheral mold 70, because the inner layer 61 of the workpiece 50 locates up above in the gravity direction. Therefore, the flange 30 is formed securely.

Note herein that, upon flare molding the flange 30 by the outer peripheral mold 70 and inner peripheral mold 80 as aforementioned, the inner peripheral mold 80 generates a force thrusting the to-be-molded portion 51 of the workpiece 50 downward in the axial direction. The force is transmitted between the outer peripheral mold 70 and the workpiece 50 as well. If the workpiece 50 should have suffered from positional displacements or misalignments occurred with respect to the outer peripheral mold 70 in the axial direction, it is not possible to form the flange 30 at a desired location. Consequently, in such an instance as upon flare molding the to-be-molded portion 51 of the workpiece 50 by the inner peripheral mold 80, the outer peripheral mold 70 needs to retain the location of the workpiece 50 in the axial direction.

Hence, the tapered cylinder portion 22 (serving as a locking portion) of workpiece 50, and the first tapered face 72 (serving as a to-be-locked portion) of the outer peripheral mold 70 lock to one another, so that the outer peripheral mold 70 retains the axial location of the workpiece 50. Note herein that a force of locking between the outer peripheral mold 70 and the workpiece 50 depends on the frictional force between the two. Consequently, the higher temperature the two has, the lower the frictional force declines.

However, the outer peripheral mold 70 shall still not be warmed actively at the flare-molding step. Due to the inner peripheral mold 80 approaching the outer peripheral mold 70, the heat of the inner peripheral mold 80 is transmitted to the surroundings by way of the workpiece 50. However, even in such a state as the heat is transmitted to the outer peripheral mold 70, the outer peripheral mold 70 has a temperature that is fully lower than the temperature of the inner peripheral mold 80. Consequently, the frictional force between the two becomes higher sufficiently, so that displacements or misalignments are less likely to occur in the relative locations between the outer peripheral mold 70 and the workpiece 50 in the axial direction. Therefore, the flange 30 is flare molded at a desired location.

While keeping such a state as the workpiece 50 is clamped between the outer peripheral mold 70 and the inner peripheral mold 80 as shown in FIG. 7, they are subsequently removed from the not-shown pressing-apparatus body. The removed unit (50, 70, 80) is put in a bath with a predetermined temperature for a predetermined period of time in order to carry out an overall heating treatment to the workpiece 50 (i.e., the overall heating treatment step "S6" shown in FIG. 4). In this instance, the entire workpiece 50 is heated, differently from the occasions during the above-described warming step and flare-molding step. This overall heating treatment eliminates internal stresses in the workpiece 50.

The workpiece 50, which is being kept in the state where it is clamped between the outer peripheral mold 70 and the inner peripheral mold 80, is subsequently cooled (i.e., the cooling step "S7" shown in FIG. 4), and then the outer peripheral mold 70 and inner peripheral mold 80 are removed from the workpiece 50 (i.e., the demolding step "S8" shown in FIG. 4). If so, the filler tube 13 is completed.

(5) Advantageous Effects

Explanations will be hereinafter made on advantageous effects regarding the manufacturing process for the filler tube 13 to be welded to the fuel tank 11 at the opening as described above, and made of thermoplastic resin.

The objective filler tube 13 comprises: the cylinder-shaped body 20; the flange 30 elongating outward radially from the cylinder-shaped body 20 at the end, and having an end face to be welded to the fuel tank 11; and the locking portion "22" disposed in the cylinder-shaped body 20 on the outer peripheral side. The workpiece 50 for the filler tube 13 comprises: the cylinder-shaped body 20; the cylindrical to-be-molded portion 51 serving as a site before flare molding the flange 30; and the locking portion "22."

The manufacturing process for the filler tube 13 uses the outer peripheral mold 70, and the inner peripheral mold 80. The outer peripheral mold 70 comprises: the counter-welding-face forming portion 75 capable of supporting the cylinder-shaped body 20 of the workpiece 50 on the outer peripheral face, and capable of forming a counter-welding face in the flange 30; and the to-be-locked portion "72" locking with respect to the locking portion "22" in the axial direction. The inner peripheral mold 80 comprises: the welding-face forming portion 81a insertable into the to-be-molded portion 51 of the workpiece 50 at least, and capable of forming a welding face in the flange 30.

Moreover, the manufacturing process for the filler tube 13 comprises: a workpiece arrangement step "S3" of arranging the workpiece 50 onto the outer peripheral mold 70 not only to axially lock the to-be-locked portion "72" with respect to the locking portion "22" but also so as to make the outer peripheral mold 70, which is set at a predetermined temperature, support the cylinder-shaped body 20 of the workpiece 50 on the outer peripheral face; and a flare-molding step "S5" of following the workpiece arrangement step "S3" to flare mold the flange 30 by inserting the inner peripheral mold 80, which is set at a higher temperature than the predetermined temperature of the outer peripheral mold 70, into the to-be-molded portion 51 on the inner peripheral side, and by relatively moving the outer peripheral mold 70 and the inner peripheral mold 80 in the axial direction to make the counter-welding-face forming portion 75 and the welding-face forming portion 81a clamp the to-be-molded portion 51 between the in the axial direction.

In accordance with the aforementioned manufacturing process, the flange 30 is molded by flare molding the cylindrical to-be-molded portion 51 in the workpiece 50. On this occasion, the following are used: the outer peripheral mold 70 supporting the workpiece 50 for the filler tube 13 on the outer peripheral side; and inner peripheral mold 80 supporting it on the inner peripheral side. Note herein that, at the flare-molding step, the inner peripheral mold 80 is set at a higher temperature than that of the outer peripheral mold 70. That is, the inner peripheral mold 80 warms the to-be-molded portion 51 of the workpiece 50 to turn it into a state of being likely to be flare molded.

Meanwhile, at the flare-molding step, the outer peripheral mold 70 has a lower temperature than the inner peripheral mold 80 does. The outer peripheral mold 70 is a mold onto which the workpiece 50 has been arranged prior to the flare-molding step. On this occasion, the locking portion "22" of the workpiece 50 is turned into a state of locking to the to-be-locked portion "72" of the outer peripheral mold 70. That is, even when the inner peripheral mold 80 is set at a higher temperature relatively at the flare-molding step, the workpiece 50 does not turn into a state of being likely to deform at the sites contacting with the outer peripheral mold 70 because the outer peripheral mold 70 has a lower temperature, so that the locking portion "22" and to be-locked portion "72" demonstrate a high frictional force. As a consequence, displacements or misalignments are less likely to occur in the relative positions between the outer peripheral mold 70 and the workpiece 50. Therefore, the flange 30 is flare molded at a desired position in the workpiece 50 for the filler tube 13.

Moreover, the manufacturing process for the filler tube 13 further comprises the warming step "S4" of following the workpiece arrangement step "S3" to warm the to-be-molded portion 51 at its predetermined location at which the inner peripheral mold 80, which is set at higher temperature than the predetermined temperature of the outer peripheral mold 70, is inserted into the to-be-molded portion 51 on the inner peripheral side for a predetermined period of time. In addition, the flare-molding step "S5" follows the warming step "S4" to flare mold the flange 30 by relatively moving the outer peripheral mold 70 and the inner peripheral mold 80 in the axial direction to make the counter-welding-face forming portion 75 and the welding-face forming portion 81a clamp the to-be-molded portion 51 between them in the axial direction.

The inner peripheral mold 80 warms the workpiece 50, but the outer peripheral mold 70 does not warm it. Consequently, the inner peripheral mold 80 warms the workpiece 50 for a predetermined period of time before carrying out flare mold. As a result, it is possible to mold the flange 30 securely upon flare molding.

Moreover, at the warming step "S4," only a site, which separates off from the locking portion "22" to a side of the end face, is warmed. Therefore, due to the warming step, the locking portion "22" is not warmed so much, so that it demonstrates a locking force securely. Note that, in the present embodiment, the site warmed during the warming step "S4" is the to-be-molded portion 51 of the workpiece 50, and is separated off from the locking portion "22" to a side of the end face. To put it in detail, in the present embodiment, the site warmed during the warming step "S4" does not involve the cylinder-shaped body 20.

In addition, the outer peripheral mold 70 has a predetermined temperature, namely, an ordinary temperature. Therefore, the workpiece 50 contacting with the outer peripheral mold 70 is not warmed by the outer peripheral mold 70 at all. By thus doing, the outer peripheral mold 70 demonstrates a locking force with respect to the workpiece 50 securely.

Moreover, the filler tube 13 and its workpiece 50 have a multi-layered structure including an innermost layer whose thickness is thickened most. At the flare-molding step "S5," the flange 30 is flare molded while warming at least the innermost layers "41 and 61" of the to-be-molded portion 51 by the inner peripheral mold 80. When the filler tube 13 has a multi-layered structure, it needs to maintain the multi-layered structure even during the warming step and flare-molding step. Forming the innermost layers "41 and 61" thickest results in making the multi-layered structure likely to sustain upon flare molding the flange 30. In addition, although the innermost layers "41 and 61" make a welding face to the fuel tank 11, the innermost layers "41 and 61" being the thickest lead to making it possible to sufficiently secure a weldment volume, so that it is possible to secure a welding force as a consequence. In particular, the innermost layers "41 and 61" come to stretch most upon flare molding the flange 30, so that they act so as to decrease the weldment volume. However, since the innermost layers "41 and 61" are thick, it is possible to secure a sufficient weldment volume even when the decrease in the weldment volume is taken into consideration.

Moreover, the manufacturing process for the filler tube 13 further comprises an overall heating-treatment step "S6" of following the flare-molding step "S5" to carry out an overall heating treatment in such a state as the filler tube 13 is kept being clamped between the outer peripheral mold 70 and the inner peripheral mold 80. Internal stresses are removed by carrying out the overall heating treatment, so that the filler tube 13 with a desired configuration is obtainable securely.

In addition, the inner peripheral mold 80 is arranged up above with respect to the outer peripheral mold 70, and is further arranged to be movable relatively with respect to the outer peripheral mold 70 in the gravity direction. Note herein that, at the warming step "S4," the workpiece 50 becomes softer on the side of the inner layer 61 but is less likely to be softer on the side of the outer layer 63, compared with the inner layer 61, because the inner peripheral mold 80 warms the workpiece 50 on the side of the inner layer 61. Consequently, the inner layer 61 is put in a state of being likely to flow, but the outer layer 63 turns into another state of being less likely to fluidize comparatively.

Therefore, upon subjecting the to-be-molded portion 51 of the workpiece 50 to flare molding, the inner layer 61, which is likely to flow, tries to flow downward in the weight direction. However, when the flange 30 is flare molded, the inner layer 61 of the workpiece 50 does not fluidize, for example, to such an extent as the inner layer 61 flows toward the bottom face in the counter-welding-face forming portion 75 of the outer peripheral mold 70, because it locates up above in the gravity direction. Therefore, the flange 30 is formed securely.

Note herein that, in the present embodiment, although the tapered cylinder portion 22 of the workpiece 50 is adapted to serve as a locking portion and the first tapered face 72 of the outer peripheral mold 70 is adapted to serve as a to-be-locked portion, the present invention shall not be limited to these. For example, when the workpiece 50 comprises a bellows section, it is also possible to make the bellows section serve as a locking portion, and to make a site corresponding to the bellows section in the outer peripheral mold 70 serve as a to-be-locked portion. Moreover, it is even possible to make the locking portion of a protrusion that protrudes outward radially from an outer peripheral face in the cylinder-shaped body 20 of the workpiece 50, and to make the to-be-locked portion of a recess that is locked to the protrusion.

What is claimed is:

1. A manufacturing process for forming a filler tube from a workpiece, the filler tube to be welded to a fuel tank at an opening thereof, the filler tube being made of thermoplastic resin,
the filler tube comprising:
a body with a cylinder shape;
a flange elongating outward radially from the body at an end thereof, the flange having an end face to be welded to the fuel tank; and
a locking portion disposed on the body on an outer peripheral side thereof;
the workpiece for forming the filler tube, the workpiece comprising:
a preformed body;
a to-be-molded portion with a cylindrical shape configured to be flare molded into the flange; and
a preformed locking portion;
the manufacturing process using an outer peripheral mold, and an inner peripheral mold;
the outer peripheral mold comprising:
a counter-welding-face forming portion capable of supporting the preformed body of the workpiece on an outer peripheral face thereof, and capable of forming a counter-welding face in the flange; and
a to-be-locked portion locking with respect to the preformed locking portion of the workpiece in an axial direction thereof;
the inner peripheral mold insertable at least into the to-be-molded portion of the workpiece, the inner peripheral mold comprising:
a welding-face forming portion capable of forming a welding face in the flange;
the manufacturing process comprising:
arranging the workpiece onto the outer peripheral mold to axially lock the to-be-locked portion with respect to the preformed locking portion and to support the preformed body of the workpiece on an outer peripheral face of the outer peripheral mold, the outer peripheral mold being set at a predetermined temperature;
inserting the inner peripheral mold into the to-be-molded portion on an inner peripheral side of the workpiece, the inner peripheral mold being set at a higher temperature than the predetermined temperature of the outer peripheral mold;
forming the flange from the to-be molded portion via flare molding by relatively moving the outer peripheral mold and the inner peripheral mold in an axial direction thereof such that the counter-welding-face forming portion and the welding-face forming portion clamp the to-be-molded portion therebetween in the axial direction; and
warming the to-be-molded portion at a predetermined location where the inner peripheral mold is inserted into the to-be-molded portion on an inner peripheral side thereof for a predetermined period of time with the inner peripheral mold being set at the higher temperature than the predetermined temperature of the outer peripheral mold, wherein:
after the predetermined time, the flange is formed via flare molding.

2. The manufacturing process for forming the filler tube according to claim 1, wherein the warming comprises warming only the to-be-molded portion of the workpiece, the to-be-molded portion of the workpiece being a portion that separates off from the locking portion in the axial direction.

3. The manufacturing process for forming the filler tube according to claim 1, wherein the predetermined temperature of the outer peripheral mold is at a room temperature.

4. The manufacturing process for forming the filler tube according to claim 1, wherein the workpiece and the filler tube formed therefrom have a multi-layered structure in which an innermost layer thereof is formed to have a thickest thickness therein, wherein:
the flare molding includes flare molding the flange while warming the innermost layer in the to-be-molded portion at least by the inner peripheral mold.

5. The manufacturing process for forming the filler tube according to claim 1, further comprising an overall heat-treating the filler tube after flare molding the flange while the filler tube remains clamped between the outer peripheral mold and the inner peripheral mold.

6. The manufacturing process for forming the filler tube according to claim 1, wherein the inner peripheral mold is arranged up above with respect to the outer peripheral mold, and is capable of moving relative, in a direction of gravity, with respect to the outer peripheral mold.

7. A manufacturing process for forming a filler tube from a workpiece, the filler tube to be welded to a fuel tank at an opening thereof, the filler tube being made of thermoplastic resin,
the filler tube comprising:
a body with a cylinder shape;
a flange elongating outward radially from the body at an end thereof, the flange having an end face to be welded to the fuel tank; and
a locking portion disposed on the body on an outer peripheral side thereof;
the workpiece for forming the filler tube, the workpiece comprising:
a preformed body;
a to-be-molded portion with a cylindrical shape configured to be flare molded into the flange; and
a preformed locking portion;
the manufacturing process using an outer peripheral mold, and an inner peripheral mold;
the outer peripheral mold comprising:
a counter-welding-face forming portion capable of supporting the preformed body of the workpiece on an outer peripheral face thereof, and capable of forming a counter-welding face in the flange; and
a to-be-locked portion locking with respect to the preformed locking portion of the workpiece in an axial direction thereof;
the inner peripheral mold insertable at least into the to-be-molded portion of the workpiece, the inner peripheral mold comprising:
a welding-face forming portion capable of forming a welding face in the flange;
the manufacturing process comprising:
arranging the workpiece onto the outer peripheral mold to axially lock the to-be-locked portion with respect to the preformed locking portion and to support the preformed body of the workpiece on an outer peripheral face of the outer peripheral mold, the outer peripheral mold being set at a predetermined temperature;

inserting the inner peripheral mold into the to-be-molded portion on an inner peripheral side of the workpiece, the inner peripheral mold being set at a higher temperature than the predetermined temperature of the outer peripheral mold; and forming the flange from the to-be molded portion via flare molding by relatively moving the outer peripheral mold and the inner peripheral mold in an axial direction thereof such that the counter-welding-face forming portion and the welding-face forming portion clamp the to-be-molded portion therebetween in the axial direction, wherein the workpiece and the filler tube formed therefrom have a multi-layered structure in which an innermost layer thereof is formed to have a thickest thickness therein, and wherein the flare molding includes flare molding the flange while warming the innermost layer in the to-be-molded portion at least by the inner peripheral mold.

8. The manufacturing process for forming the filler tube according to claim 7, wherein the predetermined temperature of the outer peripheral mold is at a room temperature.

9. The manufacturing process for forming the filler tube according to claim 7, further comprising an overall heat-treating the filler tube after flare molding the flange while the filler tube remains clamped between the outer peripheral mold and the inner peripheral mold.

10. The manufacturing process for forming the filler tube according to claim 7, wherein the inner peripheral mold is arranged up above with respect to the outer peripheral mold, and is capable of moving relative, in a direction of gravity, with respect to the outer peripheral mold.

11. A manufacturing process for forming a filler tube from a workpiece, the filler tube to be welded to a fuel tank at an opening thereof, the filler tube being made of thermoplastic resin, the filler tube comprising:
a body with a cylinder shape;
a flange elongating outward radially from the body at an end thereof, the flange having an end face to be welded to the fuel tank; and
a locking portion disposed on the body on an outer peripheral side thereof;

the workpiece for forming the filler tube, the workpiece comprising:
a preformed body;
a to-be-molded portion with a cylindrical shape configured to be flare molded into the flange; and
a preformed locking portion;

the manufacturing process using an outer peripheral mold, and an inner peripheral mold;

the outer peripheral mold comprising:
a counter-welding-face forming portion capable of supporting the preformed body of the workpiece on an outer peripheral face thereof, and capable of forming a counter-welding face in the flange; and
a to-be-locked portion locking with respect to the preformed locking portion of the workpiece in an axial direction thereof;

the inner peripheral mold insertable at least into the to-be-molded portion of the workpiece, the inner peripheral mold comprising:
a welding-face forming portion capable of forming a welding face in the flange;

the manufacturing process comprising:
arranging the workpiece onto the outer peripheral mold to axially lock the to-be-locked portion with respect to the preformed locking portion and to support the preformed body of the workpiece on an outer peripheral face of the outer peripheral mold, the outer peripheral mold being set at a predetermined temperature;

inserting the inner peripheral mold into the to-be-molded portion on an inner peripheral side of the workpiece, the inner peripheral mold being set at a higher temperature than the predetermined temperature of the outer peripheral mold;

forming the flange from the to-be molded portion via flare molding by relatively moving the outer peripheral mold and the inner peripheral mold in an axial direction thereof such that the counter-welding-face forming portion and the welding-face forming portion clamp the to-be-molded portion therebetween in the axial direction; and an overall heat-treating the filler tube after flare molding the flange while the filler tube remains clamped between the outer peripheral mold and the inner peripheral mold.

12. The manufacturing process for forming the filler tube according to claim 11, wherein the predetermined temperature of the outer peripheral mold is at a room temperature.

13. The manufacturing process for forming the filler tube according to claim 11, wherein the inner peripheral mold is arranged up above with respect to the outer peripheral mold, and is capable of moving relative, in a direction of gravity, with respect to the outer peripheral mold.

* * * * *